(12) United States Patent
Ng (10) Patent No.: US 7,207,511 B2
(45) Date of Patent: Apr. 24, 2007

(54) CONDIMENT GRINDER

(75) Inventor: Hong Wo Ng, Tsing Yi (HK)

(73) Assignee: Wing Wo Plastic Manufactory Limited, Tsuen Wan, New Territories (HK)

( * ) Notice: Subject to any disclaimer, the term of this patent is extended or adjusted under 35 U.S.C. 154(b) by 184 days.

(21) Appl. No.: 11/033,686

(22) Filed: Jan. 13, 2005

(65) Prior Publication Data

US 2005/0211806 A1 Sep. 29, 2005

(30) Foreign Application Priority Data

Mar. 29, 2004 (GB) ................. 0406902.7

(51) Int. Cl.
*A47J 42/08* (2006.01)
(52) U.S. Cl. ................. 241/101.3; 241/169.1
(58) Field of Classification Search ................ 241/168, 241/169.1, 101.3
See application file for complete search history.

(56) References Cited

U.S. PATENT DOCUMENTS 5,176,329 A 1/1993 De Coster et al.
5,785,264 A 7/1998 Yang
5,897,067 A 4/1999 Tardif et al.
2002/0117566 A1 8/2002 Cheng

FOREIGN PATENT DOCUMENTS

DE 203 04 793 U 3/2003

*Primary Examiner*—Mark Rosenbaum
(74) *Attorney, Agent, or Firm*—Leydig, Voit & Mayer, Ltd.

(57) ABSTRACT

A condiment grinder has a body for containing condiment seeds, and a condiment grinding mechanism provided at a lower open end of the body through which condiment seeds, ground by the mechanism, may be dispensed. The grinding mechanism has a female grinder and a male grinder rotatable in the female grinder for grinding condiment seeds in an annular gap between the grinders. The condiment grinder includes a base attached to the lower body end for standing the body on a surface. The base engages the female grinder and is turnable to adjust the female grinder's axial position relative to the male grinder and, hence, the width of the gap and, in turns, the ground condiment size. The base has a peripheral wall that is exposed to and accessible from all lateral sides for gripping so that the base can conveniently be turned.

20 Claims, 12 Drawing Sheets

CONDIMENT GRINDER

BACKGROUND OF THE INVENTION

The grinding mechanism of most pepper grinders is adjustable so as to provide different grinding sizes. In a known construction of the rotary grinding type, the adjustment is enabled by a disc that can be turned like a dial by its rim, which is however inconvenient to use.

The subject invention seeks to provide an improved condiment grinder incorporating a grinding mechanism whose grinding size can more easily be adjusted.

SUMMARY OF THE INVENTION

According to the invention, there is provided a condiment grinder comprising:

a body for containing condiment seeds;

a condiment grinding mechanism provided at the lower open end of the body through which condiment ground by the grinding mechanism may be dispensed, the grinding mechanism comprising a female grinder and a male grinder supported co-axially in the female grinder for rotation relative thereto for grinding condiment, the two grinders being spaced apart by an annular gap in which condiment is to be ground; and a base attached to the lower body end for standing the body on a surface, the base being in engagement with one of the female and male grinders and being turnable to adjust the axial position of said one grinder relative to the other grinder and hence the width of the gap and in turn the condiment grinding size, the base having a peripheral portion that is exposed to and accessible from all lateral sides for gripping so that the base can conveniently be turned.

Preferably, the two grinders are both resiliently biassed downwards, and the base is in engagement with said one grinder from below against the resilient bias acting upon it.

More preferably, the two grinders are resiliently biassed downwards by respective coil springs.

In a preferred arrangement, the base is in engagement with the female grinder and is rotatable to cause movement thereof relative to the male grinder.

It is preferred that the peripheral portion comprises a cylindrical wall of the base.

In a preferred embodiment, the base comprises an annular outer member including the peripheral portion and an annular inner member surrounded by the outer member and engaging said one grinder, the inner member being axially movable through a cam action by the outer member upon turning.

More preferably, the outer and inner base members are in inter-engagement by screw thread means.

Further more preferably, the outer and inner base members have respective screw threads for inter-engagement, the screw threads including inter-engageable parts to define a plurality of predetermined angular positions for the base relative to the body.

Yet further more preferably, the inter-engageable parts comprise a protrusion and a series of recesses corresponding to the predetermined positions.

Conveniently, the base and the body include respective indicia to indicate the predetermined positions.

It is preferred that the base has four equiangular predetermined positions relative to the body.

It is preferred that the base is arranged to be turned relative to the body through an angle of about 90°.

In a preferred embodiment, the inner base member receives and supports the female grinder for movement relative to the male grinder.

Preferably, the outer base member includes an outer cylindrical wall providing the peripheral portion and an inner cylindrical wall in engagement with the inner base member.

In a preferred construction, a mount secured across the lower end of the body, which connects the base to the body and supports an operating shaft of the grinding mechanism in the body, the shaft engaging through the male grinder for rotating the same.

More preferably, the mount and the base have confronting cylindrical surfaces including a pair of aligned annular grooves that are inter-engaged by a ring.

It is preferred that the shaft has a lower end extending beyond the male grinder and supported by a bearing that is secured to the or an axially movable inner member of the base.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Referring to the drawings, there is shown a pepper (condiment) grinder 10 embodying the invention, which has an upright plastic body 100 for containing pepper seeds, a wooden lid 200 closing an open top end 110 of the body 100 through which the body 100 may be refilled with pepper seeds, and a base 400 attached to the body 100 for standing the body 100 on a surface. A grinding mechanism 300 is provided generally in the base 400. Co-axially about a vertical central axis of the body 100, the lid 200 also acts as a turning knob for operating the grinding mechanism 300, whilst the base 400 may be turned to adjust the fineness/coarseness of pepper seeds ground by and dispensed through the grinding mechanism 300.

The grinding mechanism 300 has a square-sectioned metal central operating shaft 310 which extends upwardly from within the base 400 through the body 100 and the lid 200 and is then fitted at its top end 311 with a round nut 210 that holds the lid 200 closed. The mechanism 300 includes a tripod-like plastic mount 320 that supports the shaft 310 for rotation and further includes a pair of porcelain female and male grinders 370 and 380, through the three of which the shaft 310 passes.

The female grinder 370 has a cylindrical body whose inner surface has frusto-conically shaped upper and lower parts converging towards each other, on which respective slightly skewed teeth 371 and 372 are formed. The male grinder 380 has a generally frusto-conical body which includes a square central through hole engaging the shaft 310 for rotation thereby and whose outer surface has upper and lower parts formed with respective skewed teeth 381 and 382. The male grinder 380 remains generally within the female grinder 370, being spaced apart by an annular gap and in particular a frusto-conical gap between their lower teeth 382 and 372 in which pepper seeds are to be ground.

The upper teeth 371 and 381 are relatively coarse and co-operate to draw in and crush pepper seeds, whereas the lower teeth 372 and 382 are relatively fine and co-operate to subsequently grind the crushed seeds into much smaller pieces for serving.

Figure 6:
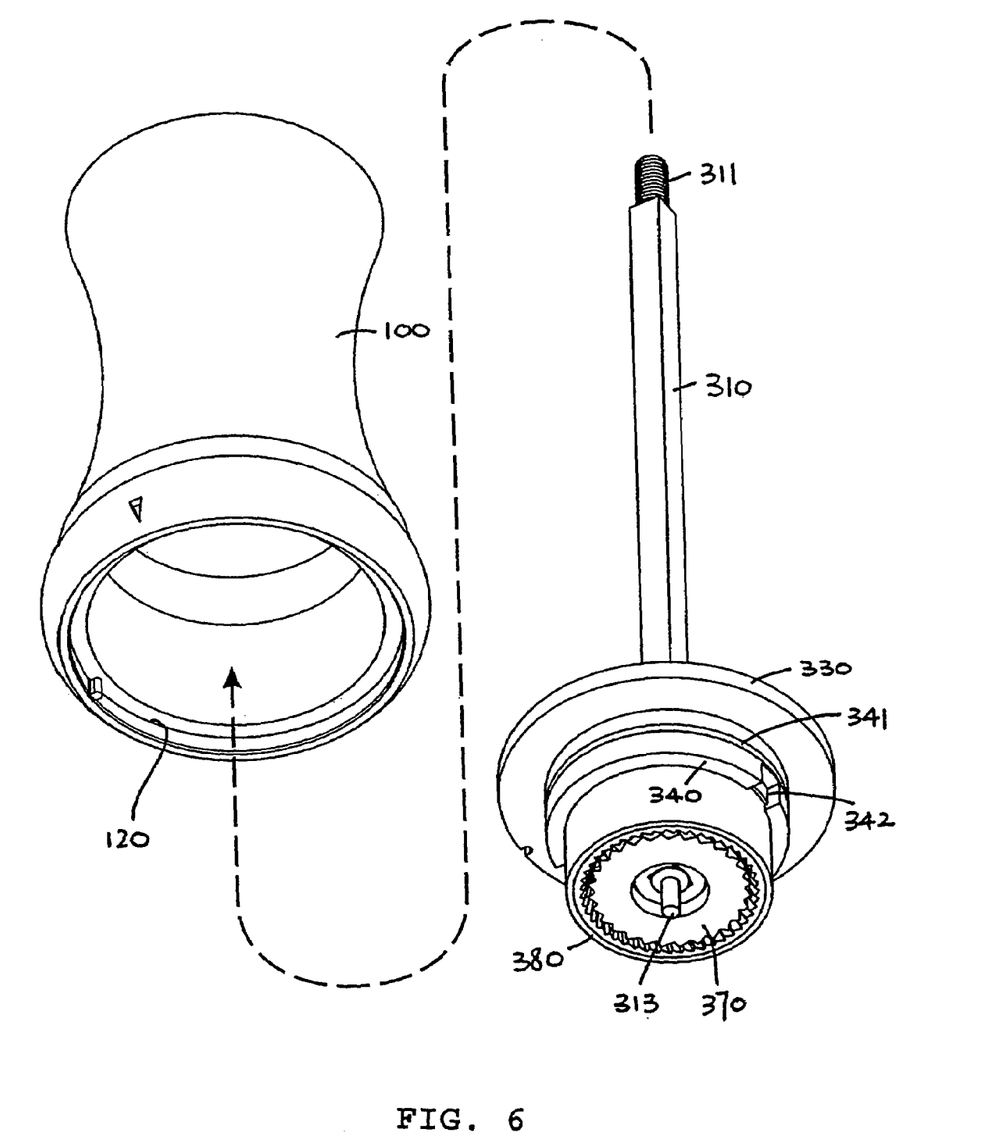
FIG. 6 is a bottom perspective view showing how the grinding mechanism of FIG. 5 is fitted to the grinder body.

The mount 320 has a circular peripheral flange 330 that is attached and sealed (for example by glue or ultrasonic welding) to extend across an open bottom end 120 of the body 100 (FIG. 6). The mount 320 includes a depending cylindrical collar 340 that receives the female grinder 370 by its an upper end as a sliding fit and supports it for limited upward/downward movement. The collar 340 has in its outer surface a pair of diametrically opposite rectangular recesses 342.

Figures 1, 2:
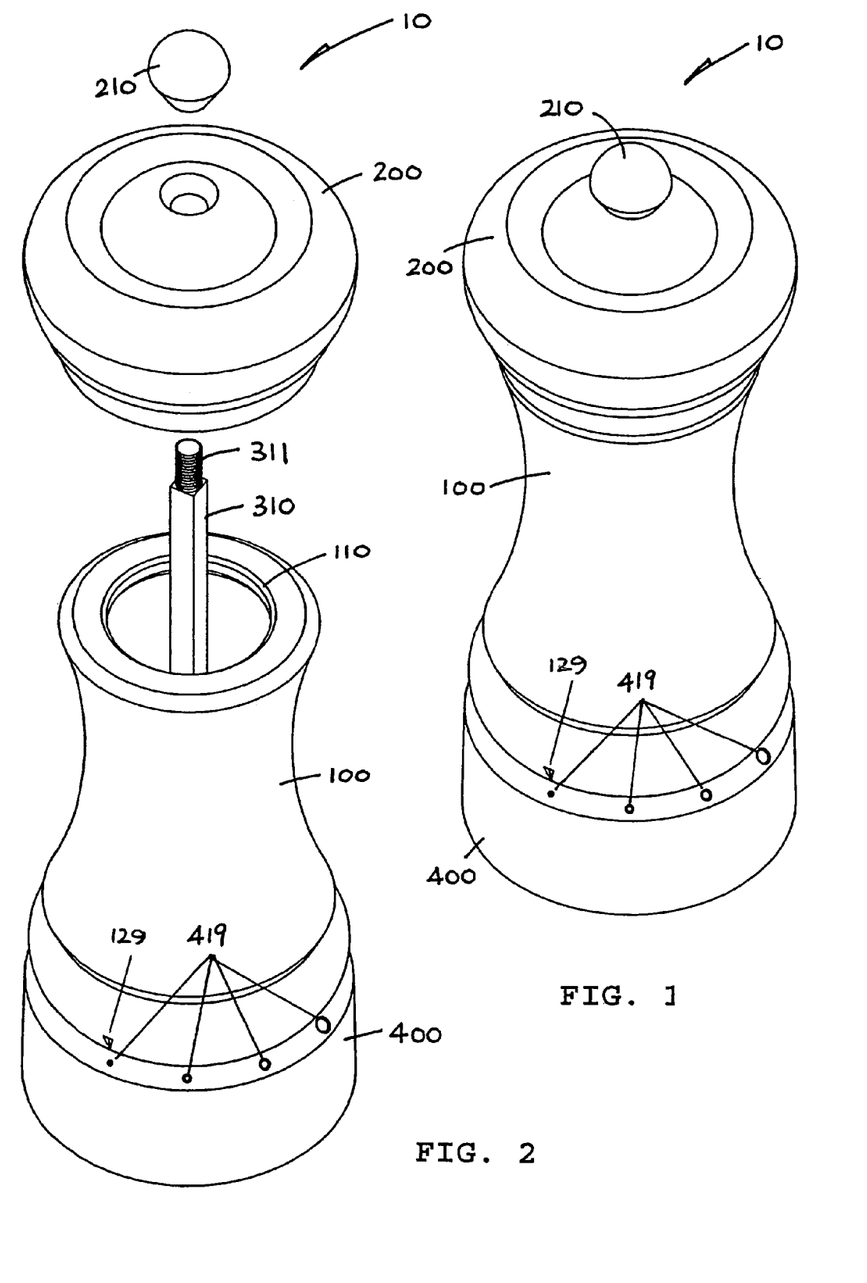
FIG. 1 is a top perspective view of an embodiment of a condiment grinder in accordance with the invention.
FIG. 2 is a top perspective view of the grinder of FIG. 1, showing a lid separated from a body with base thereof.
Figure 3:
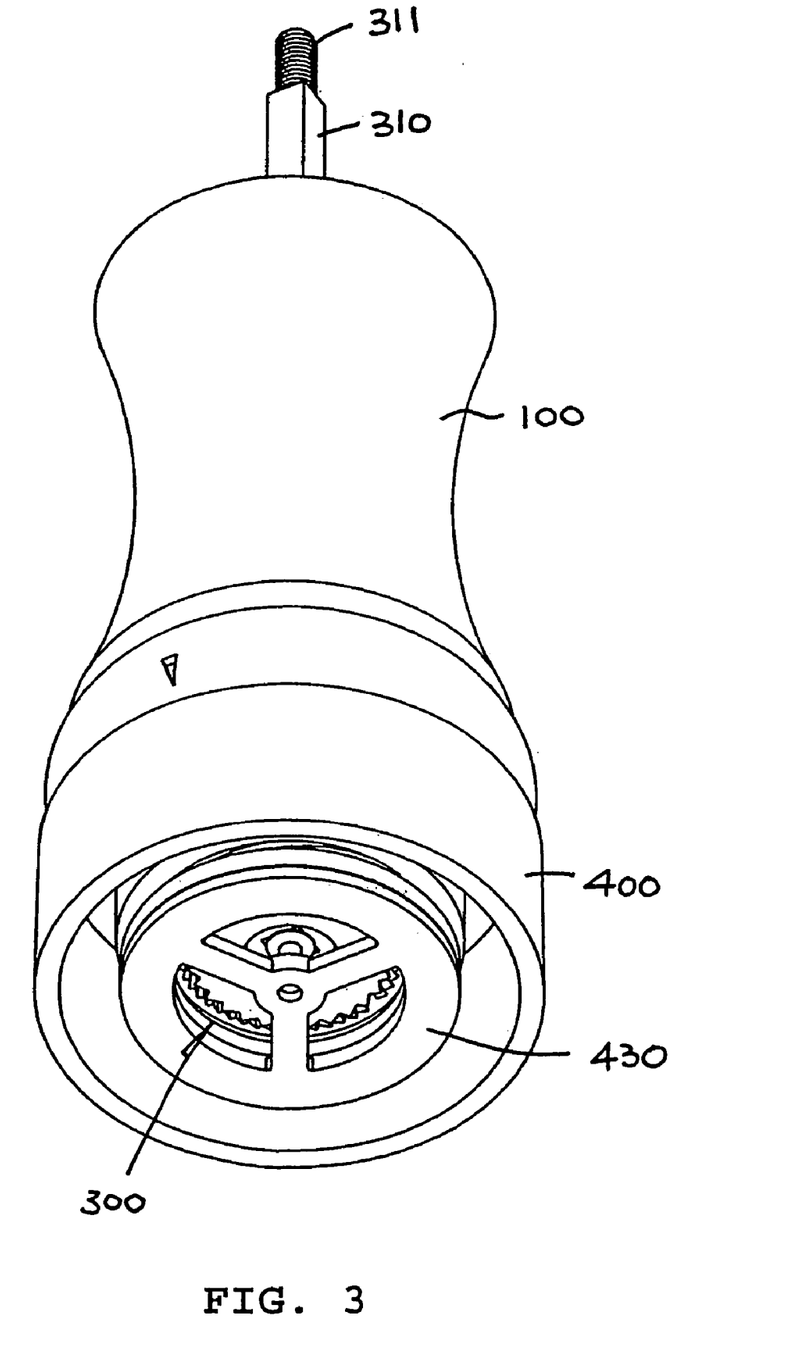
FIG. 3 is a bottom perspective view of the grinder body and base of FIG. 2.
Figure 4:
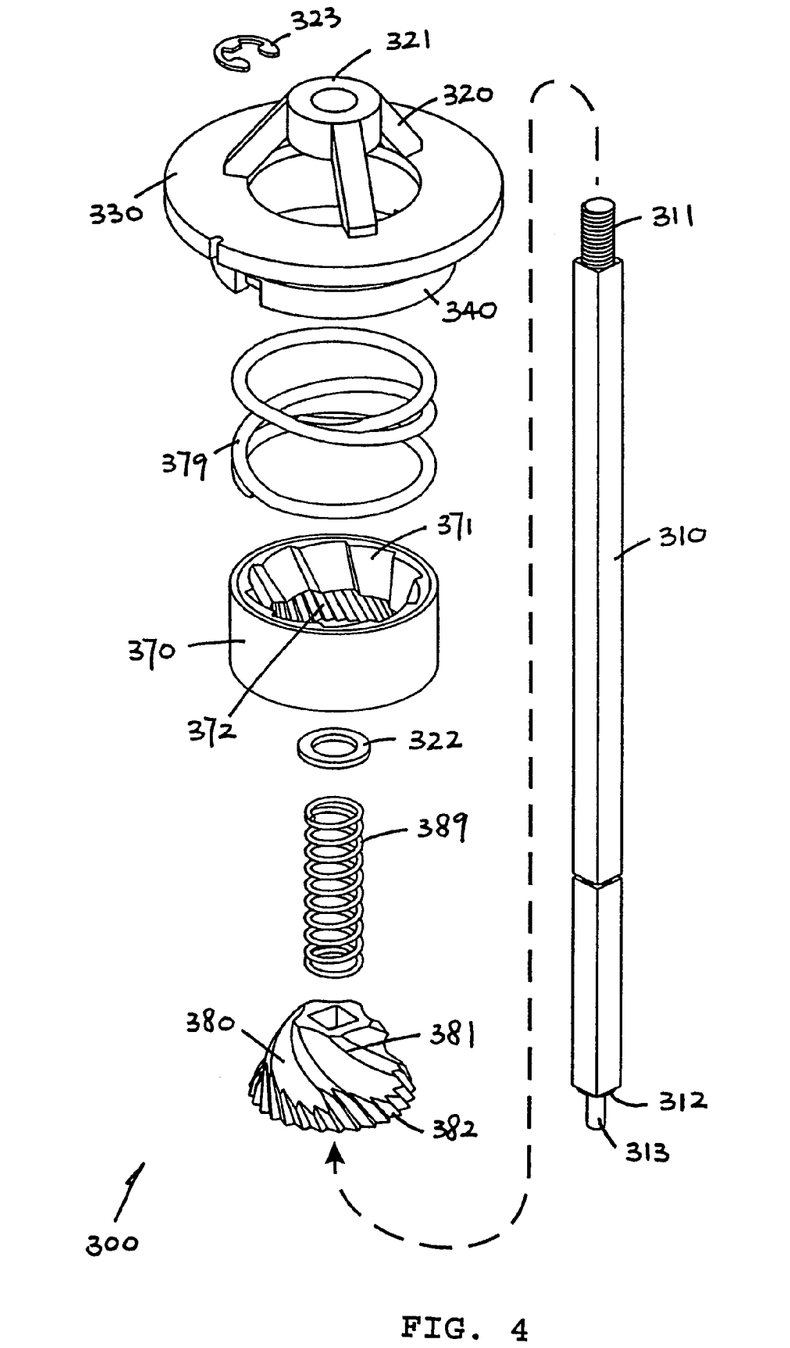
FIG. 4 is an exposed top perspective view of a grinding mechanism of the grinder of FIG. 1.
Figure 5:
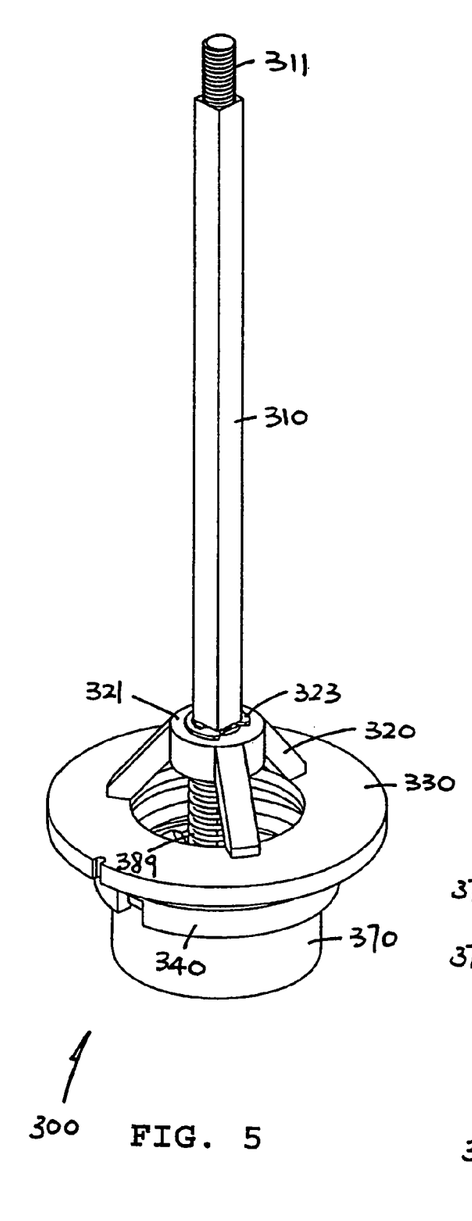
FIGS. 5 and 5A are a top perspective view and a cross-sectional side view of the grinding mechanism of FIG. 4, assembled.
Figure 5A:
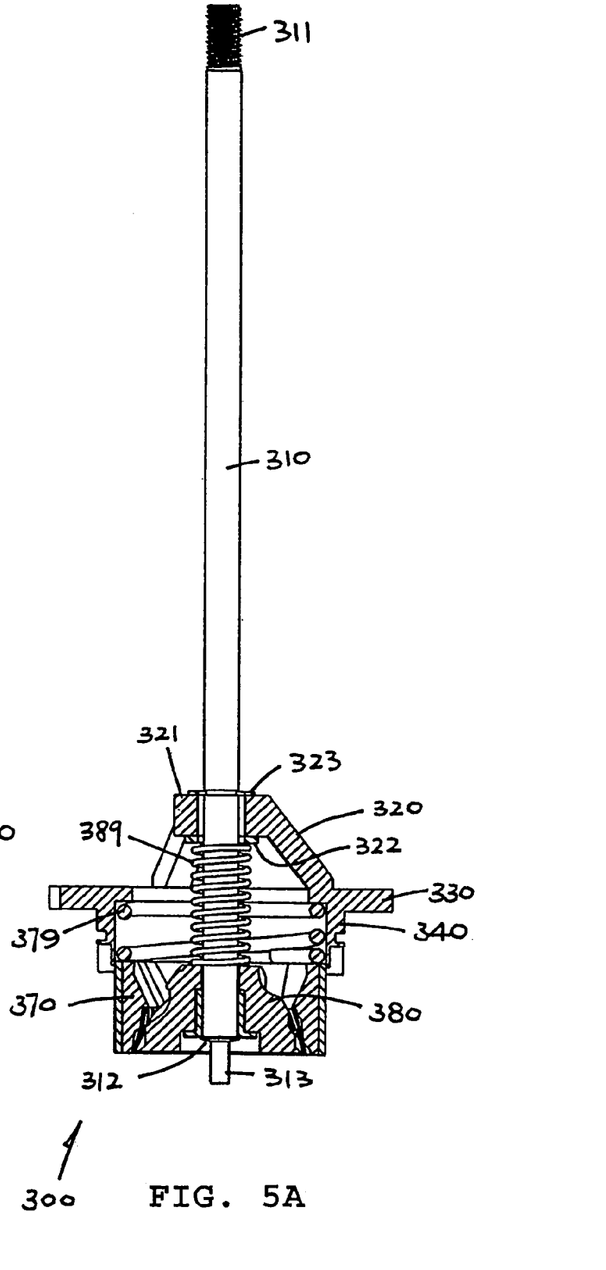

The female grinder 370 is resiliently biassed downwards by a thick co-axial coil spring 379 compressed inside the collar 340. The male grinder 380 is inserted from below into the female grinder 370, keeping it with the collar 340. A thin co-axial compression coil spring 389 on the shaft 310 resiliently biases the male grinder 380 downwards. Whilst the male grinder 380 is retained on the shaft 310 by a slightly expanded bottom end 312 thereof, the associated spring 389 acts via a washer 322 upwardly upon an apex 321 of the mount 320 that surrounds the shaft 310. A circlip 323 is fitted on the shaft 310 right above the apex 321 so as to retain the mount 320 and hence the grinders 370 and 380 at the lower end of the shaft 310, whereby the grinding mechanism 300 is assembled as a module (FIGS. 5 and 5A).

The base 400 is formed by a cylindrical outer ring 410 and a smaller cylindrical inner ring 420 assembled in the outer ring 410. The outer base ring 410 has outer and inner cylindrical double walls 411 and 412 that are integrally connected across their top ends by an annular flat wall 413. The inner wall 412 includes, on its inner surface, a pair of opposed symmetrical screw thread sections 416 each having a series of four shallow recesses 417 evenly spaced along its upper side.

The inner base ring 420 has a cylindrical wall 421, which fits slidably co-axially within the inner wall 412 of the outer base ring 410 and around the bottom of which a peripheral flange 422 extends. The flange 422 protrudes on opposite outer and inner sides of the wall 421. The wall 421 includes a pair of opposed symmetrical screw thread sections 426 on its outer surface, and a pair of rectangular tabs 427 that projects upwardly and is radially offset slightly outwards.

The inner base ring 420 is screwed into the outer base ring 410 from below through engagement between their screw thread sections 426 and 416, with the result that the inner base ring 420 will be lifted or lowered through a cam action as the outer base ring 410 is turned relative thereto in either direction by a person.

The base 400 has a diameter similar to that of the bottom end 120 of the body 100. The base 400 is connected to the bottom body end 120 such that the inner wall 412 of its outer base ring 410 is disposed about the mount collar 340 and the top wall 413 thereof is in contact with the mount flange 330. At the same time, the inner base ring 420 surrounds the female grinder 370 protruding downwardly from the collar 340, with its wall 421 and the inner side of its bottom flange 422 together acting as a sliding fit seat supporting the female grinder 370 against the action of the spring 379.

The mount flange 330 has a depending peg 331 that slidably engages an arcuate groove 415 extending over an angle of about 90° in the top wall 413 of the outer base ring 410. The inner base ring 420 meets the collar 340 from below, with its tabs 427 slidably retained by the collar recesses 342 such that the inner base ring 420 is held against turning and can only slide upwards and downwards as caused by the outer base ring 410 upon turning.

Figure 7:
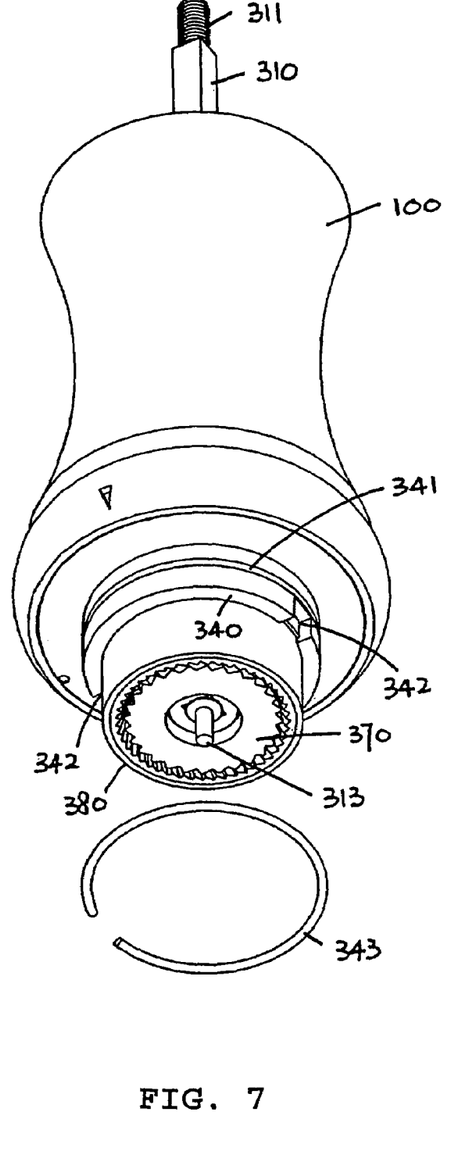
FIGS. 7 and 7A are bottom perspective views of the assembly of FIG. 6, showing how a connection ring is fitted thereon.
Figure 7A:
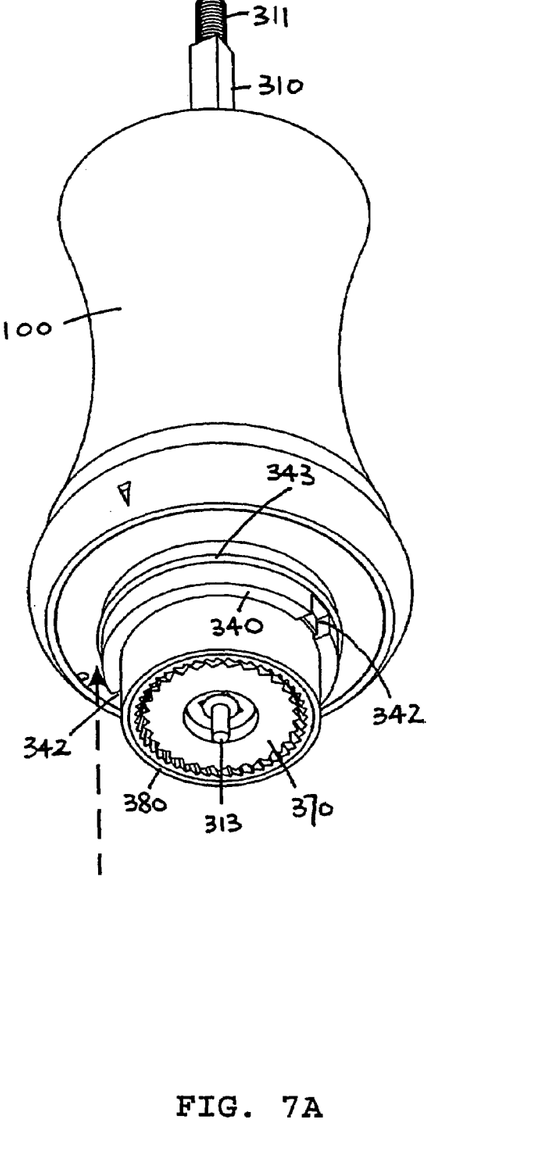
Figures 8, 8A:
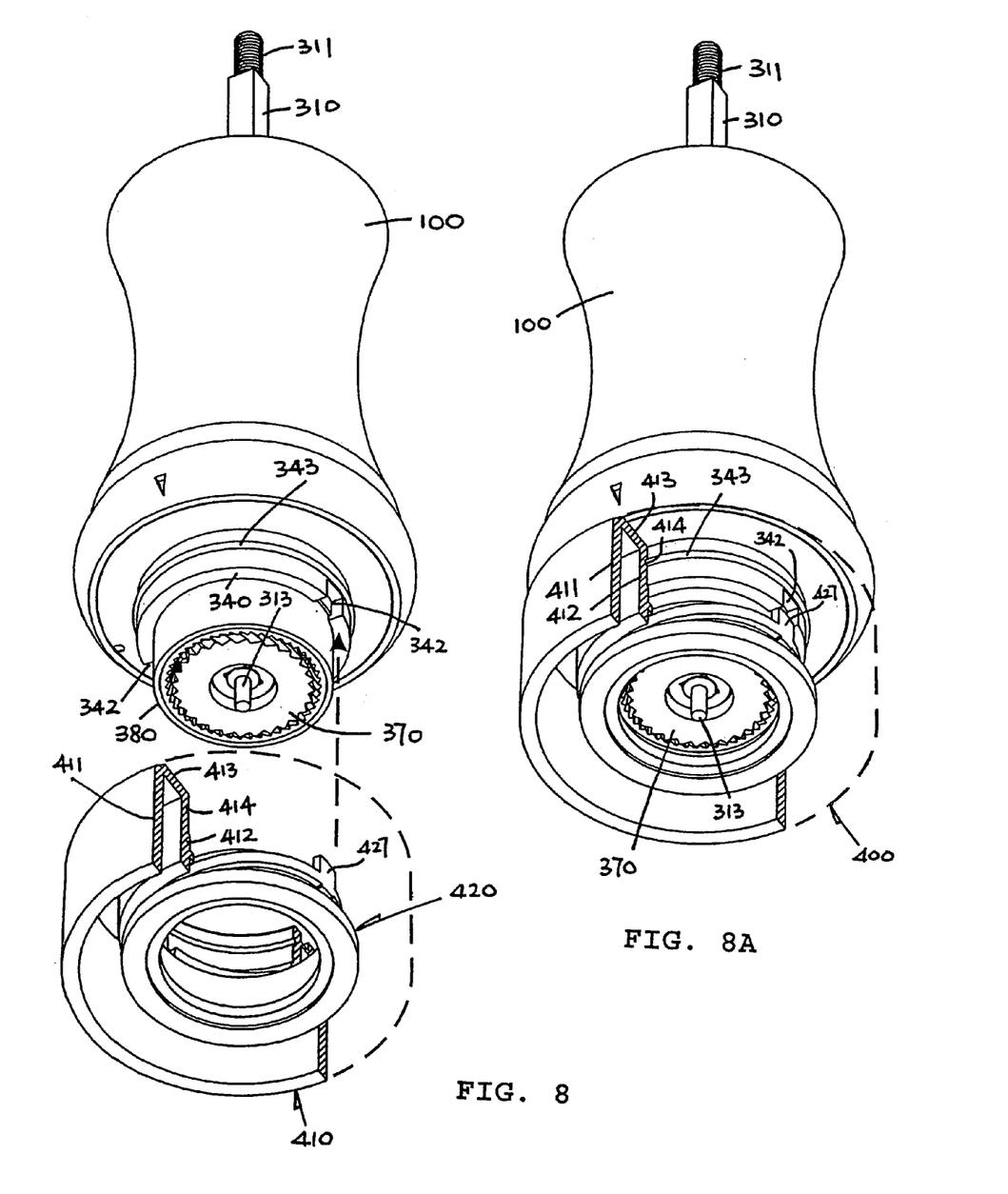
FIGS. 8 and 8A are bottom perspective views of the assembly of FIG. 7A, showing how a base is fitted thereto.

Connection of the base 400 to the body 100 via the mount 320 is secured by a split spring wire ring 343 which inter-engages a pair of aligned annular grooves 341 and 414 in the confronting surfaces between the mount collar 340 and the outer base ring inner wall 413. The spring ring 343 is first located partially in the collar groove 341 (FIGS. 7 and 7A), and the outer base ring 410 is then push-fitted about the collar 340 such that its inner wall groove 414 engages over the spring ring 343 on the collar 340 (FIGS. 8 and 8A). The collar groove 341 is just sufficiently deep to allow room for the spring ring 343 to be pressed in before the other groove 414 comes and snaps into place.

With this connection the outer base ring 410 is rotatable of turnable relative to the body 100 and hence the inner base ring 420, though the angle of rotation is limited to about 90° by reason of the sliding engagement between the peg 331 and the groove 415. The outer base ring 410 will, upon turning, lift or lower the inner base ring 420 that in turn displaces the female grinder 370 upwards or downwards relative to the male grinder 380.

Thus, turning of the base 400 by its outer ring 410 relative to the body 100 will alter the axial position of the inner base ring 420 and in turn that of the female grinder 370 relative to the male grinder 380. This will result in a change in the gap width between the lower teeth 372 and 382 of the two grinders 370 and 380, thereby adjusting the pepper grinding size.

Figure 9:
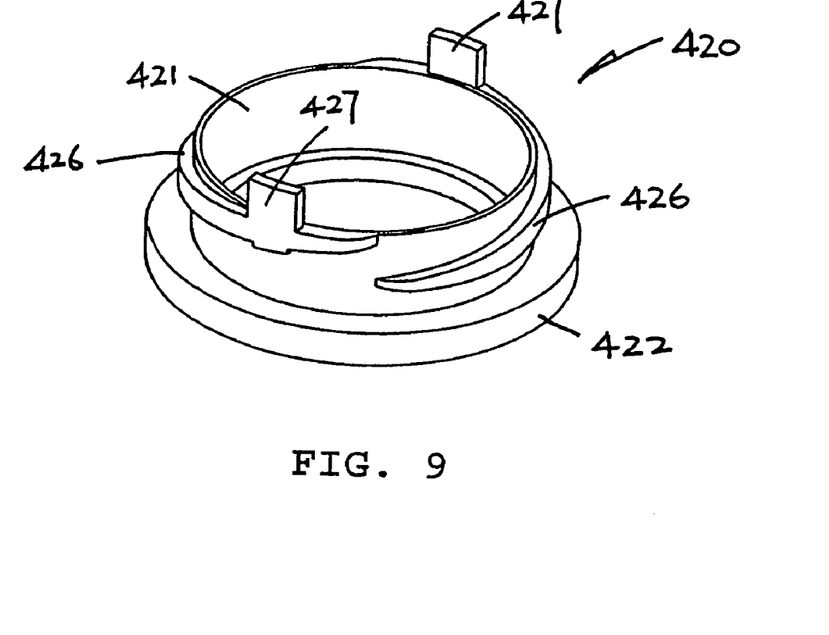
FIG. 9 is a top perspective view of an inner ring of the base of FIG. 8.
Figure 10:
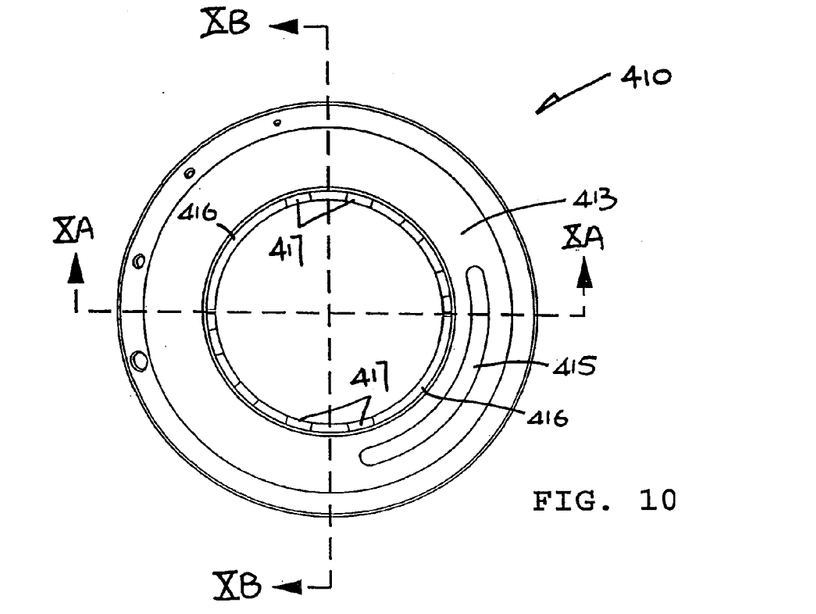
FIG. 10 is a top plan view of an outer ring of the base of FIG. 8.
Figure 10A:
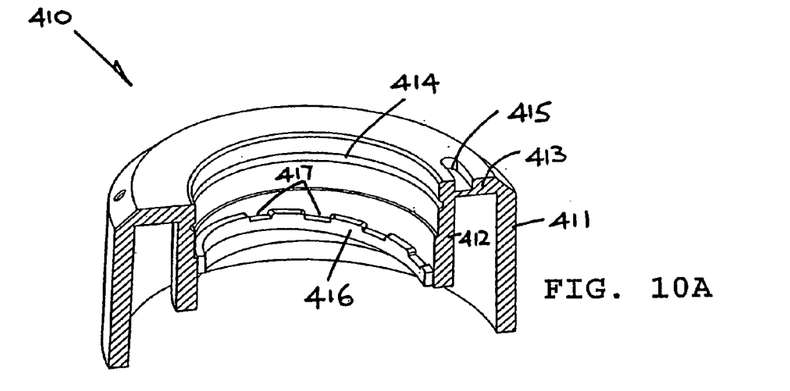
FIGS. 10A and 10B are cross-sectional views of the outer base ring of FIG. 10, taken along lines XA—XA and XB—XB respectively.
Figure 10B:
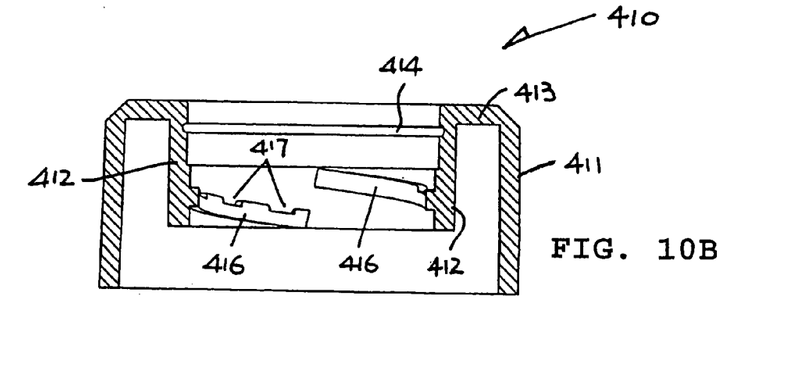
Figure 11:
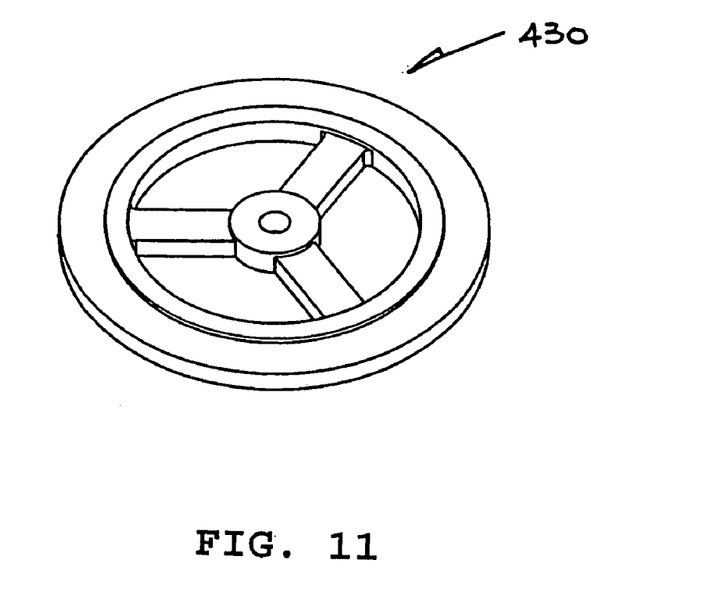
FIG. 11 is a top perspective view of a bottom bearing used in the base of FIG. 8.
Figure 12:
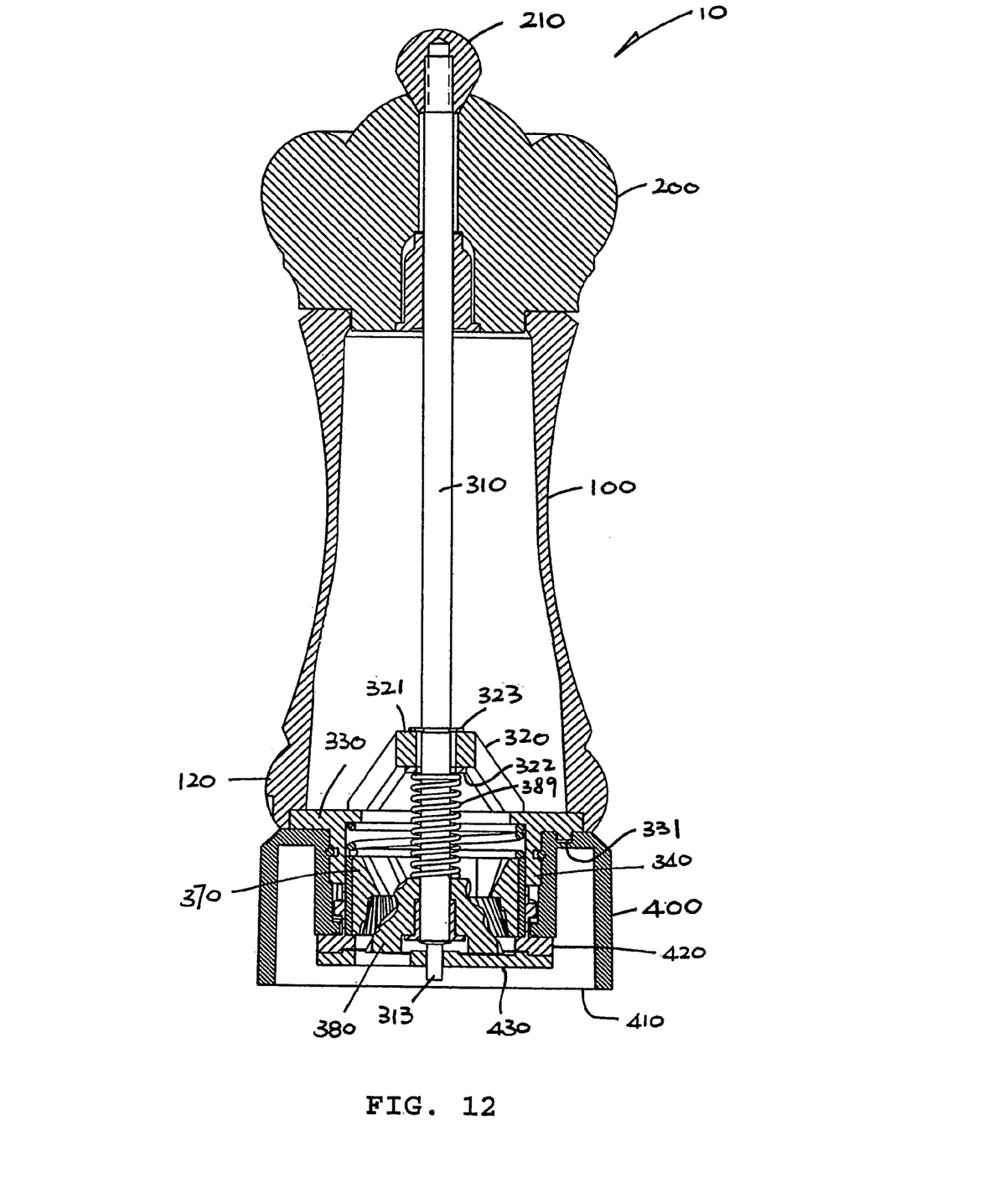
FIG. 12 is a cross-sectional side view of the grinder of FIG. 1, showing the various parts thereof.

Under the action of the spring 379 via the female grinder 370, the inner base ring 420 is resiliently pressed downwardly against the outer base ring 410 by their screw threads 426 and 416. Whilst each of the lower screw threads 416 has a said series of recesses 417, the engaging upper screw thread 426 includes the lower end of its associated tab 427 as a protrusion (FIG. 9) that is engageable with one of the recesses 417 depending on the angular position of the outer base ring 410 to define that position. As the recesses 417 are shallow and their upper corners are round, they can easily click past the lower ends of the tabs 427 upon turning of the outer base ring 410.

Figure 13:
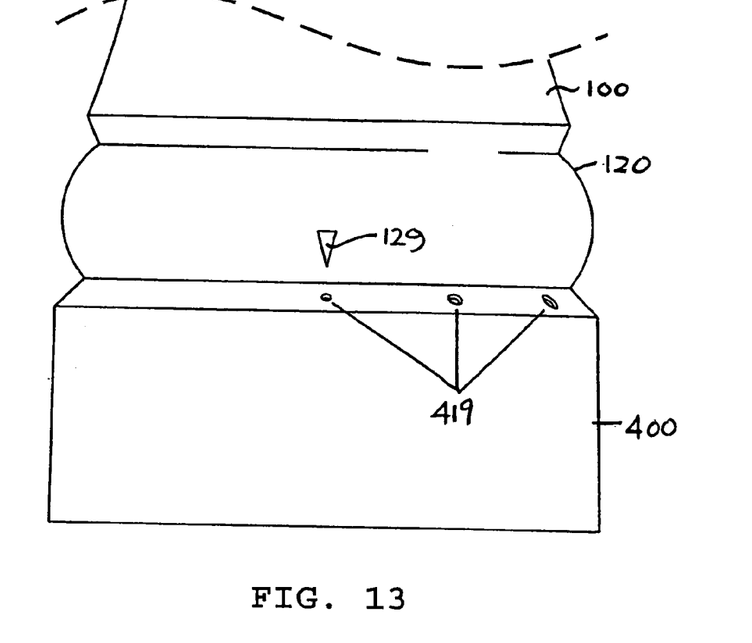
FIGS. 13 and 13A are an elevational side view and a cross-sectional side view of the bottom of the grinder of FIG. 12, with the base turned for coarse grinding.
Figure 13A:
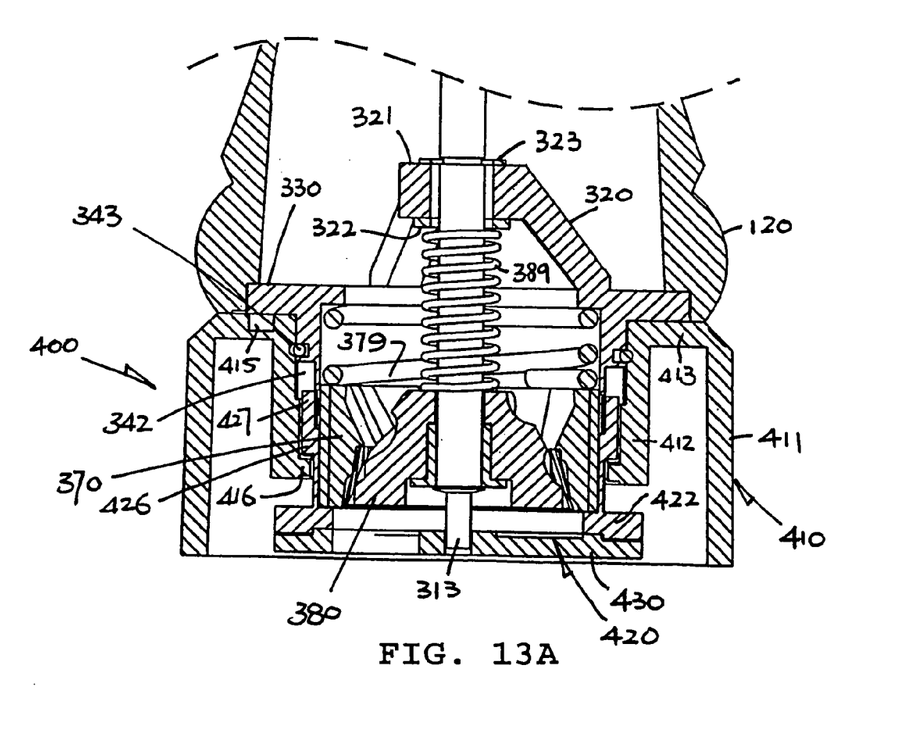
Figure 14:
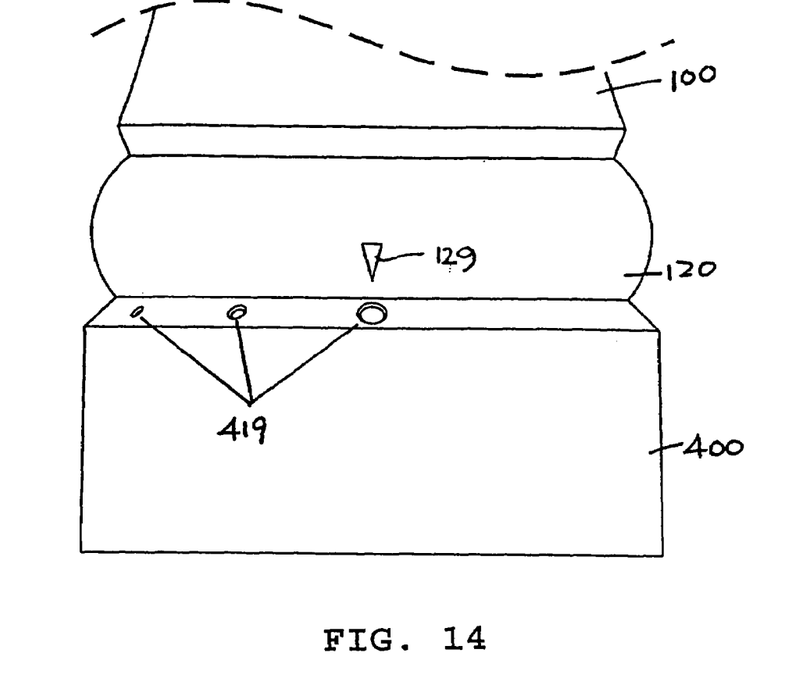
FIGS. 14 and 14A are an elevational side view and a cross-sectional side view of the bottom of the grinder of FIG. 12, with the base turned for fine grinding.
Figure 14A:
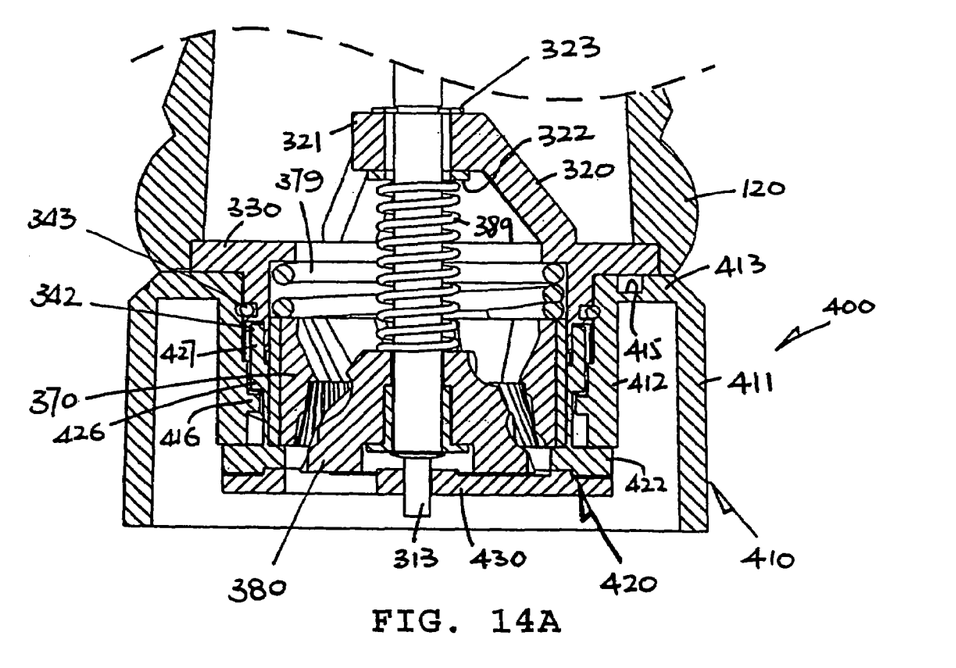

The four recesses 417 of either series define respective perceptible angular positions of the base 400 relative to the body 100 that can be felt, which correspond to gradually changing pepper grinding sizes. The bottom body end 120 includes a marker 129 on its outer surface adjacent the base 400, and the outer surface of the base 400 right below the marker 129 is marked with indicia, such as a series of four dots 419 of increasing size as shown, to indicate the four predetermined positions of the base 400 and hence pepper grinding sizes from the finest (FIGS. 13 and 13A) to the coarsest (FIGS. 14 and 14A).

The base 400 and in particular its outermost peripheral wall 411 is exposed to and is accessible from all lateral sides for being conveniently gripped and rotated to adjust the pepper grinding size. Its position, i.e. at the bottom of the grinder body 100, is particularly convenient for use as the body 100 is usually gripped by the left hand and the person only needs to shift his/her left hand down to hold the base 400 alone for adjustment, with the right hand originally on the grinding knob 200 stretched to grab also the body 100 by its top end 110.

The bottom end 312 of the shaft 310 supporting the male grinder 380 has an axial extension in the form of a narrower post 313 extending beyond the male grinder 380. A disc bearing 430 is secured (for example by glue) co-axially onto the bottom flange 422 of the inner base ring 420 and is disposed about the post 313. The bearing 430 supports and keeps the bottom shaft end 312 at centre, thereby maintaining the male grinder 380 centrally inside the female grinder 370 to prevent wearing out by direct contact and to provide a balanced and thus smooth grinding operation.

The female and male grinders 370 and 380 are both floating (i.e. not fixed in vertical position), being resiliently biassed downwards by respective springs 379 and 389. This arrangement allows some degree of freedom for each grinder 370/380 to manoeuvre, thereby reducing the risk of jamming.

It is envisaged that, in an alternative embodiment, the male grinder 380 (rather than the female grinder 370) may be movable by an inner member of the base 400, which may operate in a similar way as the present inner ring 420 but has been altered for example to include a central boss supporting the male grinder 380 from below.

The invention has been given by way of example only, and various other modifications and/or variations to the described embodiment may be made by persons skilled in the art without departing from the scope of the invention as specified in the accompanying claims.

The invention claimed is:

1. A condiment grinder comprising:
   a body for containing condiment seeds;
   a condiment grinding mechanism provided at an open end of the body through which condiment seeds ground by the grinding mechanism may be dispensed, the grinding mechanism comprising
      a female grinder, and
      a male grinder supported co-axially in the female grinder for rotation relative to the female grinder, for grinding condiment seeds, the male and female grinders being spaced apart by an annular gap in which condiment seeds are ground; and
   a base attached to the open end of the body for standing the body on a surface, the base being in engagement with one of the female and male grinders and being turnable to adjust relative axial positions of the male and female grinders and, hence, width of the annular gap, and, in turn, condiment grinding size, wherein the base comprises
      a peripheral portion that is exposed to and accessible from all lateral sides for gripping so that the base can be turned,
      an annular outer member including the peripheral portion, and
      an annular inner member surrounded by the outer member and engaging one of the male and female grinders, the inner member being axially movable through a cam action by the outer member, upon turning of the outer member.

2. The condiment grinder as claimed in claim 1, wherein the male and female grinders are both resiliently biassed toward the base, and the base is in engagement with one of the male and female grinders, against the bias resiliently acting on the one of the male and female grinders that is engaged.

3. The condiment grinder as claimed in claim 1, wherein the base is in engagement with the female grinder and is rotatable to cause movement of the female grinder relative to the male grinder.

4. The condiment grinder as claimed in claim 1, wherein the peripheral portion comprises a cylindrical wall of the base.

5. The condiment grinder as claimed in claim 1, wherein the outer and inner base members are in inter-engagement through screw threads.

6. The condiment grinder as claimed in claim 5, wherein the outer and inner base members have respective screw threads for inter-engagement, the screw threads including inter-engageable parts defining a plurality of predetermined angular positions for the base relative to the body.

7. The condiment grinder as claimed in claim 6, wherein the inter-engageable parts comprise a protrusion and a series of recesses corresponding to the predetermined positions.

8. The condiment grinder as claimed in claim 6, wherein the base and the body include respective indicia to indicate the predetermined positions.

9. The condiment grinder as claimed in claim 6, wherein the base has four equiangular predetermined positions relative to the body.

10. The condiment grinder as claimed in claim 1, wherein the base turns relative to the body through an angle of about 90°.

11. The condiment grinder as claimed in claim 1, wherein the inner base member receives and supports the female grinder for movement relative to the male grinder.

12. The condiment grinder as claimed in claim 1, wherein the outer base member includes an outer cylindrical wall providing the peripheral portion and an inner cylindrical wall in engagement with the inner base member.

13. The condiment grinder as claimed in claim 1, including a mount secured across the open end of the body, which connects the base to the body and supports an operating shaft of the grinding mechanism in the body, the shaft engaging the male grinder for rotating the male grinder.

14. The condiment grinder as claimed in claim 13, wherein the mount and the base have confronting cylindrical surfaces including a pair of aligned annular grooves that are inter-engaged by a ring.

15. The condiment grinder as claimed in claim 13, wherein the shaft has a lower end extending beyond the male grinder and supported by a bearing that is secured to an axially movable inner member of the base.

16. A condiment grinder comprising:
a body for containing condiment seeds;
a condiment grinding mechanism provided a an open end of the body through which condiment seeds ground by the grinding mechanism may be dispensed, the grinding mechanism comprising
a female grinder, and
a male grinder supported co-axially in the female grinder for rotation relative to the female grinder, for grinding condiment seeds, the male and female grinders being spaced apart by an annular gap in which condiment seeds are ground;
a base attached to the open end of the body for standing the body on a surface, the base being in engagement with one of the female and male grinders and being turnable to adjust relative axial positions of the male and female grinders and, hence, width of the annular gap, and, in turn, condiment grinding size, the base having a peripheral portion that is exposed to and accessible from all lateral sides for gripping so that the base can be turned; and
first and second coil springs respectively resiliently biasing the male and female grinders toward the base, wherein the base is in engagement with one of the male and female grinders, against the bias resiliently acting on the one of the male and female grinders that is engaged.

17. The condiment grinder as claimed in claim 16, wherein the base is in engagement with the female grinder and is rotatable to cause movement of the female grinder relative to the male grinder.

18. The condiment grinder as claimed in claim 16, wherein the outer and inner base members are in inter-engagement through screw threads.

19. The condiment grinder as claimed in claim 18, wherein the outer and inner base members have respective screw threads for inter-engagement, the screw threads including inter-engageable parts defining a plurality of pre-determined angular positions for the base relative to the body.

20. The condiment grinder as claimed in claim 19, wherein the inter-engageable parts comprise a protrusion and a series of recesses corresponding to the predetermined positions.

* * * * *